United States Patent Office 3,433,790
Patented Mar. 18, 1969

3,433,790
PROCESS FOR PRODUCING BETA CRYSTAL PHASE, 6,13-DIHYDROQUINACRIDONE
Kazuo Adachi, Masahisa Kawai, and Masakatsu Hoshi-Kawa, Tokyo, Japan, assignors to Tekkosha Co., Ltd., Tokyo, Japan, a corporation of Japan
No Drawing. Filed Aug. 1, 1966, Ser. No. 569,084
Claims priority, application Japan, Oct. 22, 1965, 40/64,450
U.S. Cl. 260—279
Int. Cl. C07d 37/04, 37/18, 37/24
5 Claims

ABSTRACT OF THE DISCLOSURE

A process for producing beta crystal phase 6,13-dihydroquinacridone by heating a dialkyl-2,5-dianilino-3,6-dihydroterephthalate in the presence of N-methylpyrrolidone at a temperature in the range of 180°–270° C.

This invention relates to a novel and useful process for producing beta crystal phase, 6,13-dihydroquinacridone.

There have been known two different crystal phases, i.e., the alpha and beta crystal phases with respect to 6,13-dihydroquinacridone, the former crystal phase being a light-colored substance of a pale yellowish brown shade and characterized by its interplanar spacings of 14.01 A., 7.01 A., 6.41 A., 3.50 A. and 3.32 A. as measured by the X-ray diffraction method, while the latter being a pinkish substance and characterized by its interplanar spacings of 11.77 A., 5.96 A., 3.67 A., 3.23 A., 6.32 A., 4.28 A. and 3.83 A. as measured by the same method.

Further, there is a great difference in infra-red absorption spectra between both the crystal phases, the beta crystal phase indicates strong absorptions at wave lengths of $7.10\mu$ and $8.0\mu$ while the alpha crystal phase does not.

Beta crystal phase 6,13-dihydroquinacridone is a very useful pigment intermediate which can be easily converted by a conventional oxidation to gamma crystal phase quinacridone which is a brilliant red pigment of excellent strength and intensity and of outstanding resistance to change either on exposure to light, to the elements, to chemical reagents, to solvents or to heat.

Among prior art processes for producing beta crystal phase 6,13-dihydroquinacridone, alpha crystal phase 6,13-dihydroquinacridone is treated with dimethyl formamide, dimethyl sulfoxide, or a particular composition such as a sodium hydroxide-water-alcohol mixture whereby its crystal phase is converted to the desired beta crystal phase and in another prior art process a dialkyl 2,5-dianilino-3,6-dihydroterephthalate is heated in tetramethylene sulfone at 250–260° C. in a nitrogen atmosphere whereby beta crystal phase 6,13-dihydroquinacridone results directly from such a precursor compound. These prior art processes, however, leave much to be desired in the long reaction time required and even if this were not so, only poor yields can be obtained.

It is an object of this invention to provide a novel and improved process for producing beta crystal phase 6,13-dihydroquinacridone.

The prior art synthesis of 6,13-dihydroquinacridone by the cyclization of a dialkyl 2,5-dianilino 3,6-dihydroterephthalate is carried out by heating the latter compound at as high as 250–300° C. in a high-boiling solvent having a boiling point higher than 240° C. No information has, however, been obtained of the solvent effect upon the reaction mechanism, crystal phase of a reaction product, reaction velocity, reaction time required, reaction temperature and the like.

In order to study such solvent effect as referred to above, the present inventors have investigated the synthesis of beta crystal phase 6,13-dihydroquinacridone, using different kinds of solvents, and, as the result of such investigation, discovered the present invention.

In accordance with this invention, beta crystal phase 6,13-dihydroquinacridone can be produced directly from a dialkyl 2,5-dianilino 3,6-dihydroterephthalate by heating the latter compound in the presence of N-methylpyrrolidone. The 6,13-dihydroquinacridone product thus produced is a pinkish material exhibiting a characteristic X-ray diffraction pattern of the beta crystal phase.

The amount of N-methylpyrrolidone used is not critical. It may be preferably used in such amounts that a suspension may be formed by stirring at room temperature, i.e., the amount of the N-methylpyrrolidone can be at least three parts by weight per part of the starting dialkyl 2,5-dianilino 3,6-dihydroterephthalate. It is, however, preferable to use from 4–6 parts by weight from the viewpoint of the ease of operation. Amounts larger than 10 parts by weight will cause an enlarged capacity of the reaction vessel or an increased amount of the recovered solvent and are accordingly not very advantageous from the industrial point of view.

The cyclization reaction occurs at temperatures above 180° C. in accordance with this invention and requires 7–8 hours at 180° C. and 5 hours at 190–202° C., for example. At such exemplified temperatures as referred to above, the reaction can be carried out under ambient pressure in an ordinary reaction vessel. If the reaction is, however, to be finished in a shorter time, it can be carried out at 202–270° C. under increased pressure in an autoclave, and reaction times of 1–2 hours suffice well for such temperatures. Still higher temperatures offer no advantage, because the reaction is most operative and proceeds almost quantitatively at the above-mentioned temperatures in the above-mentioned reaction times.

After the reaction has been finished in these manners, the N-methylpyrrolidone used and the resulting reaction product are cooled to room temperature and both are separated from each other by filtration. The N-methylpyrrolidone may be recovered almost quantitatively by distillation and used repeatedly as the solvent for the cyclization reaction. On the other hand, the resulting beta crystal phase 6,13-dihydroquinacridone product is washed with water and dried by heat to give pinkish crystals.

The pinkish crystals thus obtained are identified as being beta crystal phase 6,13-dihydroquinacridone by their X-ray diffraction pattern and they can be converted to a pure gamma crystal phase quinacridone by a heating oxidation or an oxidation in an organic solvent with a solid oxidizing agent or a gaseous one, such as molecular oxygen or air.

In contrast to prior art processes as has been explained, beta crystal phase 6,13-dihydroquinacridone can be produced easily in a shorter time, at a higher yield and without preliminary preparation of alpha crystal phase 6,13-dihydroquinacridone. Further, the solvent of this invention, i.e., N-methylpyrrolidone is a common solvent, has a relatively low-boiling point (i.e., 202° C.), and can be recovered quantitatively by distillation and accordingly serves to reduce remarkably the cost of production.

For a clearer understanding of this invention, the following specific examples are given. These examples are intended to be merely illustrative of the invention and not in limitation thereof. Unless otherwise specified all parts are by weight.

EXAMPLE I

In a suitable vessel equipped with an agitator, a reflux condenser, a thermometer and a nitrogen conduit pipe were placed 50 parts of diethyl 2,5-dianilino-3,6-dihydroterephthalate and 300 parts of N-methylpyrrolidone. The mass was heated to reflux with agitation and maintained at reflux temperature (i.e., 200–202° C.) for 5 hours while maintaining an atmosphere of nitrogen gas in the flask. After this, the charge was cooled to room temperature and then the resulting reaction product was separated by filtration from the N-methylpyrrolidone solvent employed. The solvent was charged to a distillation apparatus and recovered at 65° C. under 5 mm. Hg. On the other hand, the reaction product was twice washed with 50 parts of hot water, then once with 50 parts of acetone, and finally dried by heat at 80° C. for three hours to give 34.5 parts (i.e., 89.6% of the theoretical yield) of pinkish crystals.

The crystal had interplanar spacings of 11.77 A., 5.96 A., 5.86 A., 3.67 A., 3.32 A., 6.32 A., 4.28 A. and 3.83 A. as measured by the X-ray diffraction method and were accordingly identified as being beta crystal phase 6,13-dihydroquinacridone.

EXAMPLE II

In the same vessel as used in Example I, 50 parts of diethyl 2,5 - dianilino-3,6-dihydroterephthalate and 250 parts of N-methylpyrrolidone were placed and heated with agitation in an atmosphere of nitrogen at 180° C. for 8 hours. The charge was then cooled to room temperature. After cooling, the same procedure as followed in Example I gave 34.0 parts (i.e., 88.0% of the theoretical yield) of pinkish crystals.

The crystals exhibited the characteristic X-ray diffraction pattern and infra-red absorption spectra of beta crystal phase 6,13-dihydroquinacridone.

EXAMPLE III

In an autoclave equipped with an agitator, a reflux condenser, a thermometer and a nitrogen conduit pipe, 50 parts of diethyl 2,5-dianilino-3,6-dihydroterephthalate and 300 parts of N-methylpyrrolidone were placed and heated with agitation at 250° C. for one hour while a nitrogen atmosphere having a pressure of 5–10 kilograms per square centimeter was kept in the autoclave.

After this, the charge was cooled to room temperature and reduced in pressure to ambient atmosphere and the same procedure as followed in Example I gave 36.0 parts (i.e., 93.5% of the theoretical yield) of pinkish beta crystal phase 6,13-dihydroquinacridone.

EXAMPLE IV

In the same autoclave as used in Example III, 50 parts of diethyl 2,5-dianilino-3,6-dihydroterephthalate and 200 parts of N-methylpyrrolidone were placed and heated with agitation at 270° C. for one hour while a nitrogen atmosphere having a pressure of about 10–15 kilograms per square centimeter was maintained in the autoclave.

After this, the charge was cooled to room temperature and reduced in pressure to ambient atmosphere and the same procedure as followed in Example I gave 37.0 parts (i.e., 96.0% of the theoretical yield) of a pinkish crystal product.

Its infra-red absorption spectra and X-ray diffraction pattern indicated that the crystal product was a pure beta crystal phase 6,13-dihydroquinacridone product.

EXAMPLE V

In the same vessel as used in Example I, 50 parts of dimethyl 2,5-dianilino-3,6-dihydroterephthalate and 250 parts N-methylpyrrolidone were placed and heated with agitation in an atmosphere of nitrogen at 200–202° C. for 7 hours. The charge was then cooled to room temperature. After this, the same procedure as followed in Example I gave 35.5 parts (i.e., 85.5% of the theoretical yield) of beta crystal phase 6,13-dihydroquinacridone.

EXAMPLE VI

In the same vessel as used in Example I, 50 parts of di-isopropyl 2,5-dianilino 3,6-dihydroterephthalate and 250 parts of N-methylpyrrolidone were placed and heated with agitation in an atmosphere of nitrogen at 200–202° C. for five hours. The charge was then cooled to room temperature. After this, the same procedure as followed in Example I gave 32.0 parts (i.e., 88.0% of the theoretical yield) of beta crystal phase 6,13-dihydroquinacridone.

EXAMPLE VII

In the same autoclave as used in Example III, 50 parts of dimethyl 2,5-dianilino 3,6-dihydroterephthalate and 250 parts N-methylpyrrolidone were placed and heated with agitation at 260° C. for one hour while a nitrogen atmosphere having a pressure of 5–10 kilograms per square centimeter was kept in the autoclave.

After this, the charge was cooled to room temperature and reduced in pressure to ambient atmosphere and the same procedure as followed in Example I gave 39.0 parts (i.e., 93.5% of the theoretical yield) of beta crystal phase 6,13-dihydroquinacridone.

The embodiments of the invention is which an exclusive property or privilege is claimed are defined as follows:

1. The process which comprises heating a dialkyl-2,5-dianilino-3,6-dihydroterephthalate in the presence of N-methylpyrrolidone at a temperature in the range of 180°–202° C. to obtain beta crystal phase 6,13-dihydroquinacridone.

2. The process of claim 1, in which N-methylpyrrolidone is used in an amount of 3–10 parts by weight per part by weight of the dialkyl-2,5-dianilino-3,6-dihydroterephthalate employed.

3. A process which comprises heating a dialkyl-2,5-dianilino-3,6-dihydroterephthalate in the presence of N-methylpyrrolidone at a temperature in the range of 202°–270° C. under a pressure of more than one kilogram per square centimeter to obtain beta crystal phase 6,13-dihydroquinacridone.

4. The process of claim 3, in which N-methylpyrrolidone is used in an amount of 3–10 parts by weight per part by weight of the dialkyl-2,5-dianilino-3,6-dihydroterephthalate employed.

5. In the process for producing beta crystal phase 6,13-dihydroquinacridone by heating a dialkyl-2,5-dianilino-3,6-dihydroterephthalate in a high-boiling solvent, the improvement which comprises carrying out the reaction in N-methylpyrrolidone.

References Cited

UNITED STATES PATENTS

| | | | |
|---|---|---|---|
| 3,007,930 | 11/1961 | Manger et al. | 260—279 |
| 3,074,950 | 1/1963 | Deuschel et al. | 260—279 |
| 3,372,163 | 3/1968 | Tessandori | 260—279 |

ALEX MAZEL, *Primary Examiner.*

D. G. DAUS, *Assistant Examiner.*

U.S. Cl. X.R.

260—326.5, 471